United States Patent [19]

Moline

[11] Patent Number: 4,941,119

[45] Date of Patent: Jul. 10, 1990

[54] METHOD AND APPARATUS FOR PREDICTING AN OVERFLOW IN AN INTEGER MULTIPLY

[75] Inventor: Timothy W. Moline, Coon Rapids, Minn.

[73] Assignee: Control Data Corporation, Minneapolis, Minn.

[21] Appl. No.: 278,294

[22] Filed: Nov. 30, 1988

[51] Int. Cl.⁵ .................................................. G06F 7/38
[52] U.S. Cl. .................................................... 364/745
[58] Field of Search ............... 364/745, 748, 200, 900, 364/736.5

[56] References Cited

U.S. PATENT DOCUMENTS

| | | | |
|---|---|---|---|
| 4,366,548 | 12/1982 | Kregness et al. | 364/748 |
| 4,429,370 | 1/1984 | Blau et al. | 364/748 |
| 4,437,165 | 3/1984 | Onodera | 364/749 |
| 4,442,498 | 4/1984 | Rosen | 364/745 |
| 4,534,010 | 8/1985 | Kobayashi et al. | 364/748 |
| 4,590,584 | 5/1986 | Yaguchi et al. | 364/748 |
| 4,796,217 | 1/1989 | Takahashi et al. | 364/745 |

Primary Examiner—Gary V. Harkcom
Assistant Examiner—Tan V. Mai
Attorney, Agent, or Firm—Joseph A. Genovese; Robert M. Angus

[57] ABSTRACT

An overflow prediction scheme is provided to operate in parallel with an integer multiply within a computer to predict overflow conditions of the resultant register. The operands to be multiplied are examined to determine the position of the most significant bit. The position values are summed to determine a minimum resultant size. If the minimum resultant size exceeds the size of the data field of the resultant register, an overflow flag is set. If the minimum resultant size is less than the size of the resultant register data field, the overflow flag is not set. When the minimum resultant size equals the size of the resultant register data field, the setting of the overflow flag will depend on the signs of the expected and actual resultant.

14 Claims, 2 Drawing Sheets

METHOD AND APPARATUS FOR PREDICTING AN OVERFLOW IN AN INTEGER MULTIPLY

BACKGROUND OF THE INVENTION

This invention relates to integer multiplication as employed in computers, and particularly to a method and apparatus for predicting overflow conditions in integer multiplication processes.

Integer overflow conditions occur when the result of an integer operation is physically larger than the resultant register in which it is to be stored. An overflow condition may occur in integer multiplication operations when the result of the integer multiplication operation on two or more operands is such as to create a resultant which exceeds the size of the resultant register. Heretofore, in integer multiplication apparatus, it has not been possible to predict an overflow condition simply by examination of the two input operands. Instead, it has been common in integer mathematics, to examine the resultant to determine if an overflow, condition has occurred. One problem with prior approaches is that sequentially performing the integer multiply and then, determining overflow, requires a substantial amount of time. This occurs because of the large volume of data resulting from the integer multiplication operation. It is desirable, therefore, to have a method and apparatus to predict overflow conditions in parallel with the performance of the integer multiply operation, so that an overflow condition is indicated as the result of the integer multiply ultimately is determined.

(Overflow prediction has been accomplished in floating-point multiply operations by adding the exponent, values of the floating point operands. Examples of such techniques may be found in the Blau et al. U.S. Pat. No. 4,429,370, Rosen U.S. Pat. No. 4,442,498, and Kobayashi et al. U.S. Pat. No. 4,534,010. However, because floating point operands contain exponents representative of the magnitude of the operand, such operands lend themselves well to prediction of overflow conditions. On the other hand, integer operands, which have no exponents, are not so suitable.)

SUMMARY OF THE INVENTION

It is, accordingly, an object of the present invention to provide an overflow prediction method and apparatus for predicting potential overflow conditions in integer multiplication.

In accordance with the present invention, apparatus is provided for determining the position of the most significant bit (MSB) of each input operand for the integer multiplication operation. The MSB position values for both of the operands are summed to determine the minimum position of the most significant bit (MSB) of the resultant. If that number exceeds the size of the data field of the resultant register, an overflow condition exists.

One feature of the invention resides in the fact that if the minimum value of the resultant MSV is less than the size of the data field of the resultant register, the overflow flag is not set. In the case where the resultant MSB value equals the data field size of the resultant register, the expected and actual sign bits of the resultant are examined to set the overflow flag.

Another feature of the invention resides in the determination of the minimum position value of the MSB of the resultant by summing the twos exponent values of the MSBs of the operands. The minimum position value is that sum plus 1.

Another feature of the present invention resides in the fact that overflow prediction is accomplished in parallel with the integer multiply operation so that most overflow conditions may be established while the integer multiply operation is being performed. As a result, integer multiply may be accomplished more rapidly than in prior systems.

BRIEF DESCRIPTION OF THE DRAWINGS

The above and other features of this invention will be more fully understood from the following detailed description, and the accompanying drawings, in which.

DESCRIPTION OF THE PREFERRED EMBODIMENT

Figure 1:
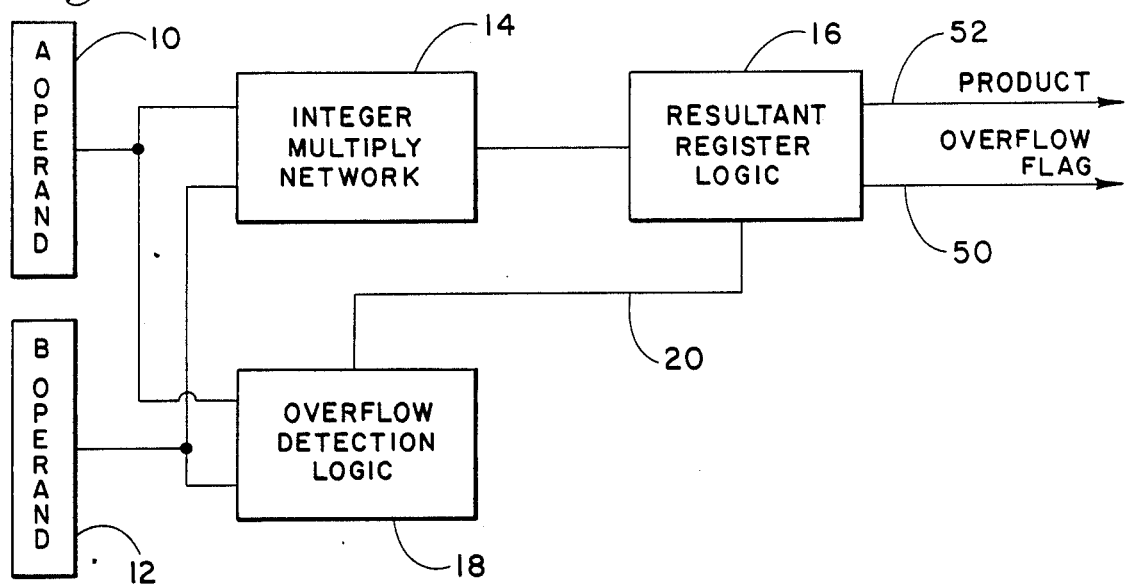
FIG. 1 is a block diagram of an integer multiply network with overflow detection logic in accordance with the presently preferred embodiment of the present invention.

With reference to the drawings and particularly to FIG. 1, there is illustrated an integer multiply network in accordance with the presently preferred embodiment of the present invention. The network includes a pair of operand registers 10 and 12, designated as the A operand and B operand registers, respectively. Each register provides an input operand to integer multiply network 14 which performs an integer multiplication operation. The result of the integer multiply network is stored in the resultant register logic 16, which includes a resultant register of fixed size (bit positions). The resultant register typically includes a data field and a sign bit. For example, a 64-bit resultant register might contain a sign bit at a fixed position (such as the most significant position) and a data field of 63-bit positions The present invention is directed at potential overflow of the data field of the resultant register (i.e., the 63-bit positions in this example). Also connected to operand registers 10 and 12 is overflow logic 18 shown in more detail in FIG. 2. Overflow detection logic 18 determines the value of the minimum position of the MSB of the expected resultant, and provides that value via lead 20 to logic 16. Logic 16 determines overflow condition based on the value on lead 20 and the sign bit of the resultant from network 14, and provides the resultant and overflow flag via leads 52 and 50, respectively.

Figure 2:
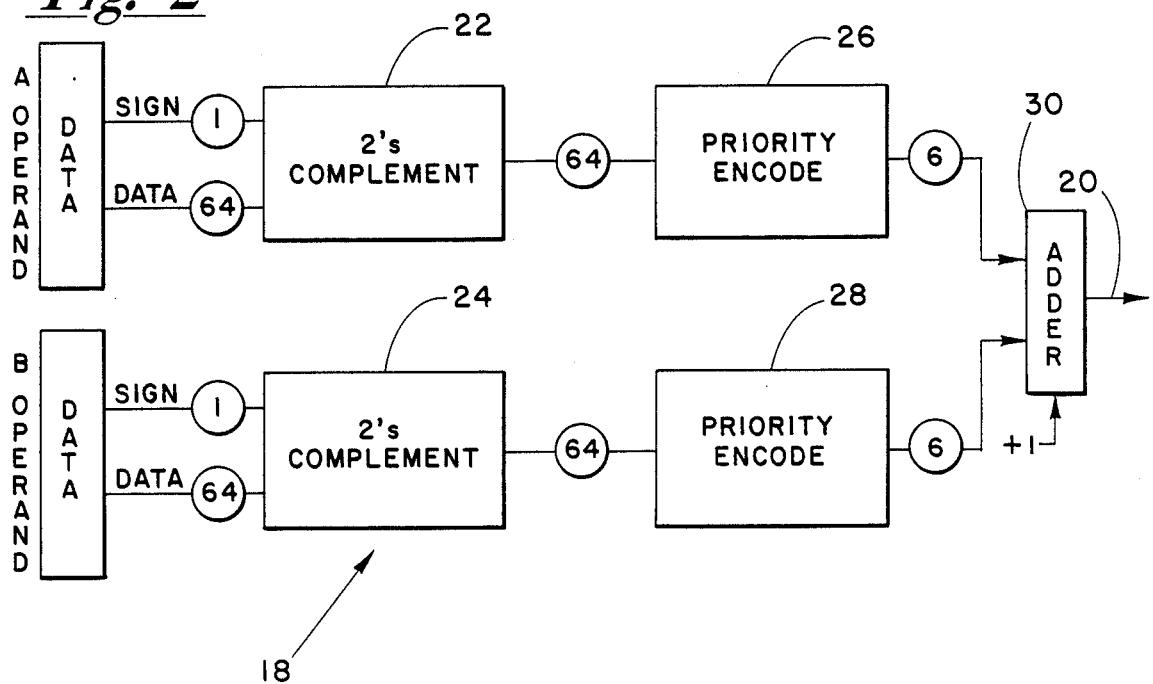
FIG. 2 is a detailed block circuit diagram of the overflow detection logic in accordance with the presently preferred

FIG. 2 is a block diagram of overflow detection logic 18 for determining the minimum size of the resultant of the integer multiplication of operands A and B. The sign bit is at a fixed position in the operand, such as the most significant bit. The sign bit operates 2's complement circuit 22 or 24, respectively, to 2's complement the operand if the sign bit indicates that the corresponding operand is negative. For example, in a negative logic scheme (in which the present invention will be described) a binary "1" sign bit will indicate that the corresponding operand represents a negative number. Hence, the corresponding 2's complement circuit will 2's complement the bits of the data field of the operand. If the sign bit is "0", indicating a positive number, the operand is not 2's complemented. The result from 2's complement circuits 22 and 24 is forwarded to respective priority encode circuits 26 and 28 which determine the value of the position of the MSB of each of the operand's data fields. The results from encode circuits 26 and 28 are summed by adder 30 to provide a signal output at 20 indicative of the minimum value of the position of the MSB in the resultant to be determined by the multiply network 14.

Figure 3:
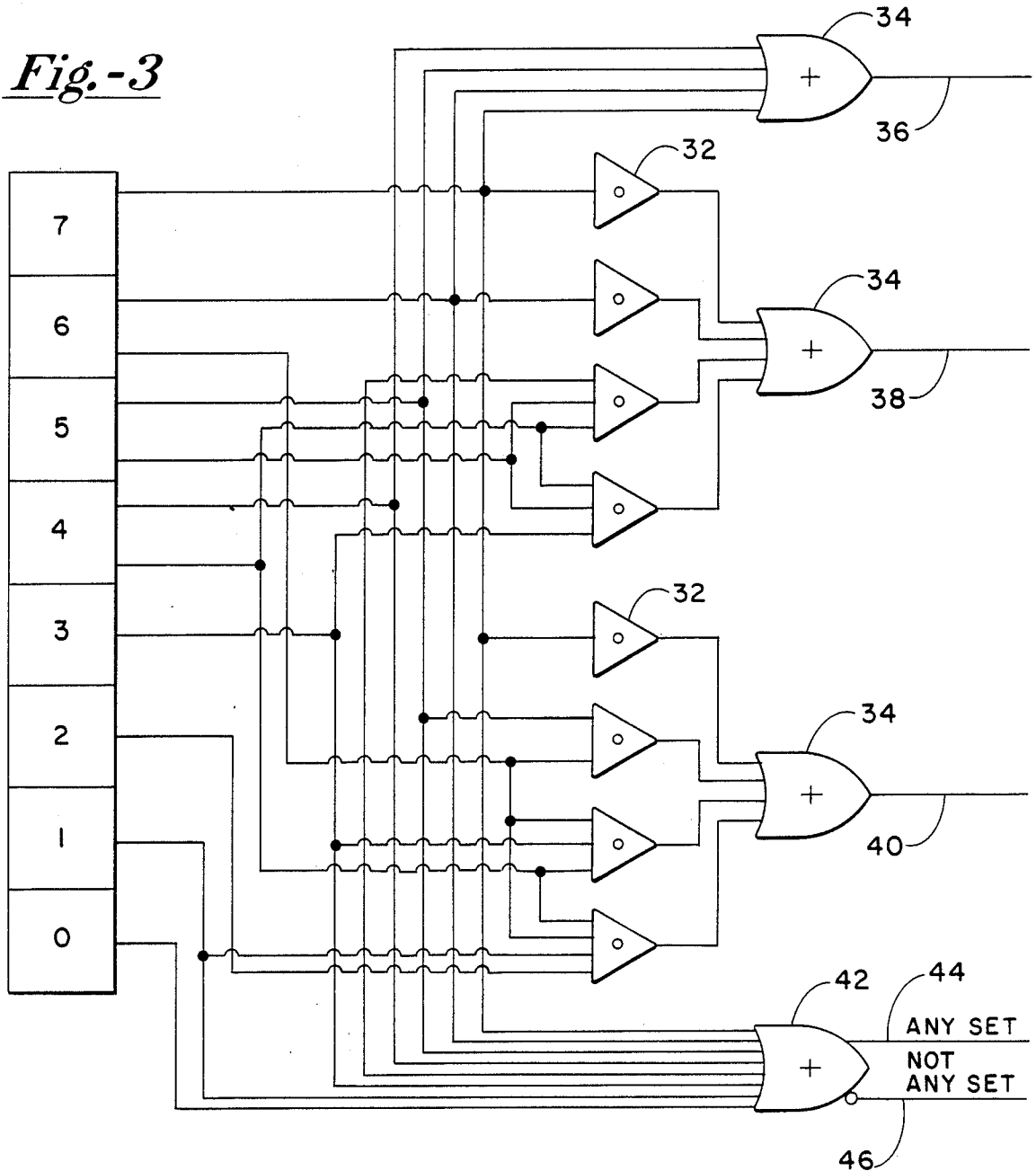
FIG. 3 is a detailed block diagram of a priority encode circuit used in the overflow detection logic of FIG. 2.

FIG. 3 illustrates a portion of the priority encode circuit 22 or 24. In FIG. 3, an 8-bit priority encoding scheme is illustrated whereby the most significant bit of bits 1-7 operates selected AND gates 32 and OR gates 34 so provide true or not-true outputs on leads 36, 38 and 40 indicative of which of bits 1-7 is the MSB. The true or not-true condition of the signals on leads 36, 38 and 40 represents the binary value of the MSB bit position. For example, if bit 7 is the MSB, OR gates 34 are operated so that a true output appears on each of lines 36, 38 and 40 (111) representative of "7" in binary; if bit 5 is the MSB, a true condition appears on lines 36 and 40 and a not-true condition appears on line 38 (101). If any of bits 0-7 are ones, OR gate 42 is operated to provide a true output on line 44 indicative of "ANY SET"; if all of bits 0-7 are zeros, lines 36, 38 and 40 provide not true outputs, and OR gate 42 provides an output on line 46 indicative of "NOT ANY SET".

Each 8-bit portion of the data field may be encoded using the scheme of FIG. 3. The ANY SET bits are also encoded in the same scheme to find the 8-bit field with the MSB. Hence, the priority encoder determines the value of the position of the operands' MSB. The NOT ANY SET signal is also determined for the entire 64-bit field of each operand for purposes to be explained below.

It can be shown that the value of the maximum position of the MSB of a resultant of an integer multiply operation is equal the sum of the values of the positions of the MSBs of each operand. It can also be shown that the value of the minimum position of a resultant of integer multiply operation is one less than the value of the maximum position. For example, for operands having their MSBs in the 21st ($2^{20}$) and 28th ($2^{27}$) positions, the maximum position of the MSB of the resultant of an integer multiply will be at the 49th ($2^{48}$) position and the minimum position of the MSB will be at the 48th ($2^{47}$) position. Using the priority encode circuit of FIG. 3, values are determined which are actually the 2's powers of the MSB of the operands ("20" and "27" in this example). Hence, to determine the minimum position of the MSB of the integer multiply resultant, adder 30 adds binary "1" to the sum of the results of encoder circuits 26 and 28. The result, which is a binary number representative of minimum position of the resultant expected from the integer multiply operation in multiplier 14, is provided via channel 20 to resultant register logic 16 (FIG. 9).

If the value of the minimum position of the resultant MSB determined by adder 30 and supplied to logic 16 exceeds the size of the data field of the resultant register, an overflow condition is determined to exist and an overflow flag is set by logic 16 on lead 50. If the value determined by adder 30 is smaller than the size of the data field of the resultant register, an overflow flag is not set. If the value of the minimum position of the resultant MSB determined by adder 30 equals the size of the data field of the resultant register, a comparison of the actual and expected sign bits of the resultant is made to determine possible overflow conditions.

Figure 4:
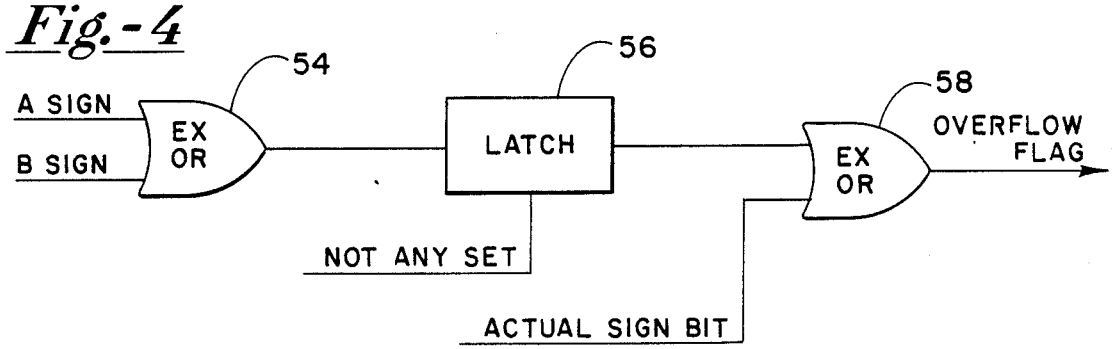
FIG. 4 is a block diagram of a portion of the overflow flag set of the embodiment of the present invention.

Referring to FIG. 4, the sign bits of each operand (see FIG. 2) are inputted to an EXCLUSIVE-OR gate 54 to determine the expected sign bit of the resultant. Thus, if both operand are positive (sign bit "0") or negative (sign bit "1"), the resultant is expected to be positive (sign bit "0"), whereas if the operands have different sign bits, the resultant sign bit is expected to be negative (sign bit "1"). If one of the operands has a value of zero (a condition indicated by the true value of the NOT ANY SET signal for either operand), the expected resultant sign bit is forced to "0" (positive), by latch 56, regardless of the result of the EXCLUSIVE OR comparison of the operand sign bits. This is accomplished because the true resultant will have a positive zero value (sign bit "0"), negative zero being an illegal number.

Upon determination of the actual resultant by integer multiply network 14, the actual and expected sign bits are compared by an EXCLUSIVE OR gate 58 and the overflow flag is set if different. Hence, the overflow flag is set on lead 50 whenever the value determined by adder 30 is greater than the size of the data field of the resultant register, or when the value determined by adder 30 equals the resultant register data field size and the actual and expected sign bits are different (with the special case that the expected sign bit of the product of a zero-valued operand is positive). The overflow flag is not set on lead 50 when the value determined by adder 30 is smaller than the size of the data field of the resultant register, or when the value determined by adder 30 equals the resultant register data field size and the actual and expected sign bits are the same (with the special case that the expected sign bit of the product of a zero-valued operand is positive). Thus, the overflow condition can be absolutely determined for cases where adder 30 determines a value for the minimum MSB position either greater or smaller than the data field size of the resultant register. The actual resultant is required only in those case where the determined value for the minimum MSB position equals the data field size, and in that case the overflow condition can be determined by logically examining the actual and expected sign bits and the NOT ANY SET bit. Hence, post-muliplication determination of overflow is made with a minimum volume of data.

In operation of the apparatus, assume the simplified example of a resultant register in logic 16 having a data field of 8 bits and a sign bit at the ninth (most significant) position. An overflow condition will occur if the data field of the resultant is nine bits or longer. Assume further the decimal example of 41 times 12, in binary:

|   |   |   |
|---|---|---|
|   | 00101001 | (Operand A) |
| X | 00001100 | (Operand B) |
|   | 111101100 | (Resultant) |

As can be determined, the most significant "1" bit in operand A (in register 10) is at bit position 6 ($2^5$), whereas the most significant "1" bit in operand B (in register 12) is at bit position 4 ($2^3$). As a result, adder 30 adds binary 0101, plus binary 0011, also binary 0001, which is binary 1001 or decimal 9. Hence, adder 30 determines that the minimum position of the most significant bit (MSB) of the resultant is at the ninth position of the data field. Logic 16, therefore, sets the overflow flag is set on lead 50

Consider the situation of decimal 14 times 9 (1110 times 1001). Adder circuit 46 will determine a value of 7 (binary 0111) for the minimum position of the MSB of the resultant which, under the conditions stated, is less than the data field size and will not result in setting an overflow flag on lead 20.

Therefore, if the adder 46 determines a minimum resultant MSB position which is less than the size of the data field of the resultant register in logic 16, no overflow flag is set on lead 20. If adder 46 determines a minimum resultant MSB position exceeding the resultant register data field size, an overflow flag is set on lead 20. If the calculated MSB equals the size of the data field of the resultant register, the actual resultant may, or may not, actually exceed the register size. Consider decimal positive 18 times positive 14 (00010010 times 1110 in binary) where the calculated minimum resultant MSB is at the eighth position, which equals the register size, and the actual resultant will be 11111100 in binary, which is within the register size. Conversely, consider decimal positive 21 times positive 13 (binary 10101 times 1101) where the calculated minimum resultant MSB is at the eighth position but the actual resultant is 100010001 which has a real MSB at ninth position. The "1" bit at the ninth position of the resultant occupies the position of the sign bit. Since the expected sign bit is "0" (positive), the expected and actual sign bits are different, thereby indicating an overflow condition. Similarly, if one operand is negative and the other positive (expected sign bit "1"), an overflow in multiplication would force the sign bit at the ninth position to "0" causing a setting of the overflow flag.

The present invention thus provides an effective apparatus and process for predicting overflow conditions in an integer multiply network. The apparatus and technique are effective in operation and permit determination of overflow conditions in parallel with the actual calculation of the resultant, thereby significantly increasing the speed of the integer multiplying operation.

This invention is not to be limited by the embodiment shown in the drawings and described in the description, which is given by way of example and not of limitation, but only in accordance with the scope of the appended claims.

What is claimed is:

1. Apparatus for predicting an overflow condition in a resultant register means for storing the resultant of an integer multiplication operation of first and second binary-coded integer operands, said resultant register means having an established number of bit positions, said apparatus comprising:
    first determining means for establishing a first number representative of the position in said first integer operand of the most significant bit having a predetermined value;
    second determining means for establishing a second number representative of the position in said second integer operand of the most significant bit having said predetermined value;
    adder means for summing said first and second numbers to determine a total number; and
    overflow indicator means for indicating an overflow condition whenever said total number exceeds the number of bit positions in said resultant register means.

2. Apparatus according to claim 1 wherein said first determining means comprising first logic means for determining the position in said first operand of the most significant bit of said first operand having said predetermined value and for providing a binary representation of the position of said most significant bit in said first operand, and said second determining means comprising second logic means for determining the position in said second register means of the most significant bit of said second operand having said predetermined value and for providing a binary representation of the position of said most significant bit in said second operand means.

3. Apparatus according to claim 2 wherein said adder means is responsive to said first and second determining means to sum the binary representations provided thereby.

4. Apparatus according to claim 1 wherein said first and second operands each includes a sign bit whose value is representative of whether the respective operand is positive or negative, said apparatus further including third determining means responsive to the values of the sign bits of said first on second operands for establishing a value of an expected sign bit of the resultant, and compare means responsive to said expected sign bit and to an actual sign bit of the resultant resulting from said integer multiplication operation for determining whether the values of said expected sign bit and said actual sign bit are the same or different, said overflow indicator means being further responsive to said compare means for indicating an overflow condition when the values of said expected sign bit and said actual sign bit are different.

5. Apparatus according to claim 4 wherein said first determining means comprising first logic means for determining the position in said first operand of the most significant bit of said first operand having said predetermined value and for providing a binary representation of the position of said most significant bit in said first operand, and said second determining means comprising second logic means for determining the position in said second register means of the most significant bit of said second operand having said predetermined value and for providing a binary representation of the position of said most significant bit in said second operand means.

6. Apparatus according to claim 5 wherein said adder means is responsive to said first and second determining means to sum the binary representations provided thereby.

7. Apparatus according to claim 4 further including 2's complement means responsive to the value of the sign bit of each of said operands for 2's complementing the respective operand if the value of the respective sign bit represents that the value of the respective operand is negative.

8. The method of predicting an overflow condition in a resultant register means for storing the resultant of an integer multiplication of first and second binary-coded integer operands, said resultant register means having an established number of bit positions, said method comprising:
    establishing a first number based on the position in said first integer operand of the most significant bit having a predetermined value;
    establishing a second number based on the position in said second integer operand of the most significant bit having said predetermined value;

determining the sum of said first and second numbers; and setting an overflow flag when the sum of said first and second numbers exceeds the number of bit positions in said resultant register means.

9. The method according to claim 8 wherein the step of establishing a first number comprises determining the position of said most significant bit in said first operand and providing a first binary representation of said position of said most significant bit in said first operand, and the step of establishing a second number comprises determining the position of said most significant bit in said second operand and providing a second binary representation of said position of said most significant bit in said second operand.

10. The method according to claim 9 wherein the sum of said first and second numbers is determined by summing said first and second binary representations.

11. The method according to claim 8 wherein said first and second operands each includes a sign bit whose value is representative of whether the respective operand is positive or negative, said method further including establishing a value of an expected sign bit of the resultant based on the values of the sign bits of said first and second operands, comparing the value of the expected sign bit to the value of an actual sign bit of the resultant, and setting said overflow flag if the values of said expected sign bit and said actual sign bit are different.

12. The method according to claim 11 wherein the step of establishing a first number comprises determining the position of said most significant bit in said first operand and providing a first binary representation of said position of said most significant bit in said first operand, and the step of establishing a second number comprises determining the position of said most significant bit in said second operand and providing a second binary representation of said position of said most significant bit in said second operand.

13. The method according to claim 12 wherein the sum of said first and second numbers is determined by summing said first and second binary representations.

14. The method according to claim 11 further including 2's complementing each operand whose sign bit value represents that the operand is negative.

* * * * *

UNITED STATES PATENT AND TRADEMARK OFFICE
CERTIFICATE OF CORRECTION

PATENT NO. : 4,941,119

DATED : JULY 10, 1990

INVENTOR(S) : Timothy W. Moline

It is certified that error appears in the above—identified patent and that said Letters Patent is hereby corrected as shown below:

Claim 4, line 6 (col. 6, line 23) for "on" read "and"

Signed and Sealed this

Thirteenth Day of August, 1991

Attest:

HARRY F. MANBECK, JR.

Attesting Officer

Commissioner of Patents and Trademarks